United States Patent Office 3,197,499
Patented July 27, 1965

3,197,499
PROCESS FOR PURIFYING BENZOPHENONE
4,4'-DICARBOXYLIC ACID
John H. McCracken, Monroeville, and Johann G. D.
Schulz and Arthur C. Whitaker, Pittsburgh, Pa., assignors to Gulf Research & Development Company, Pittsburgh, Pa., a corporation of Delaware
No Drawing. Filed Nov. 30, 1960, Ser. No. 72,593
2 Claims. (Cl. 260—475)

This application relates to a process for purifying symmetrical diarylketone carboxylic acids and for producing the methyl esters thereof.

Diarylketone carboxylic acids which can be purified in accordance with the procedure of this invention can be represented in general by the following structural formula:

wherein R is an aryl radical containing one or more rings, at least one of which is an aromatic ring, such as phenyl, biphenyl, naphthyl, phenanthryl, anthryl, indyl, dihydronaphthyl, cyclohexylphenyl, etc., carrying a carboxyl group, said carboxyl groups being symmetrically arranged on said aromatic rings, said aryl radicals carrying as nuclear substituents 0 to four radicals selected from the group consisting of primary, secondary and tertiary alkyls, having from one to 16 carbon atoms, preferably from one to eight carbon atoms, such as methyl, ethyl, n-propyl, isopropyl, isobutyl, amyl, isoamyl, hexyl, isooctyl, decyl, tetradecyl, hexadecyl, etc., F, CL, Br, I, $NO_2$, $SO_3H$, COOR (where R is an alkyl group), $NH_2$, OH, etc. Specific examples of diarylketone carboxylic acids which can be purified in accordance with the process are benzophenone-2,2'-dicarboethoxy-4,4'-dicarboxylic acid, di-(3-methyl, 4-carboxy, 6-chloro)-1-naphthyl ketone, di-(2,6-dipropyl, 9-carboxy)-10-anthryl ketone, 2,2'-dicarboxy, 4,4'-dicyclohexyl-5,5'-diisooctyl 6,6'-diaminobenzophenone, di-(5-carboxy, 7-hexadecyl)-8-phenanthryl ketone, di-(1,4-dihydro, 7-hydroxy, 8-carboxy)-5-naphthyl ketone, di-(6,6'-dinitro, 7,7'-dicarboxy)-4-indyl ketone, etc.

The process of this invention is particularly applicable in the purification of symmetrical diarylketone carboxylic acids, such as benzophenone 4,4'-dicarboxylic acid, prepared in accordance with the procedure set forth in copending application Serial No. 822,415, now Patent No. 3,075,007, filed in the names of John H. McCracken and Johann G. D. Schulz on June 24, 1959. By "symmetrical" we mean identical location of all substituents in each aryl radical relative to the ring-connecting carbon. Briefly in the process of the application a 1,1-diarylalkane, such as 1,1-di(para)tolylethane, is oxidized with nitric acid having a concentration of about five to about 70 percent at a temperature of about 110° to about 350° C. and a pressure of about atmospheric to about 500 pounds per square inch gauge for about one minute to about 48 hours. At the end of this time a solid amorphous diarylketone dicarboxylic acid, such as benzophenone 4,4'-dicarboxylic acid, precipitates out of the reaction mixture and can be recovered therefrom by simple filtration. Unfortunately the diarylketone dicarboxylic acid so produced, instead of being desirably white, is admixed with contaminants which renders the same yellow to tan.

We have found that diarylketone carboxylic acids so produced can be purified of undesirable contaminants and rendered substantially white by a process wherein the impure diarylketone carboxylic acid is reacted with excess methanol to obtain the corresponding methyl ester of said diarylketone carboxylic acid and, preferably after separating said methyl ester from said excess methanol, converting said methyl ester to said diarylketone carboxylic acids. In the event the methyl ester is not converted to the corresponding diarylketone carboxylic acid a pure, light colored dimethyl ester is obtained.

The first step of the process involves converting the symmetrical diarylketone carboxylic acid to the corresponding methyl ester. This is effected by reacting the symmetrical diarylketone carboxylic acid with methanol. The amount of methanol employed is critical and must be in excess of the amount stoichiometrically required to react with the diarylketone carboxylic acid. Generally at least about 10, and preferably about 20 to about 30, volumes of methanol in excess of that stoichiometrically needed to react with the diarylketone carboxylic acid is sufficient. About one to about 20 percent by weight based on the diarylketone carboxylic acid, of an esterification catalyst, such as sulfuric acid, hydrochloric acid, toluene sulfonic acid, etc. can also be employed.

The esterification reaction is carried out at a temperature of at least about 65° C., preferably about 110° to about 160° C., at autogenous pressure, for at least about 0.5, preferably about one to about five hours.

When the diarylketone carboxylic acid was admixed with the methanol a slurry formed, since the acid was not soluble in the methanol. At the end of the esterification period on recovery of the product a slurry was still present, since the methyl ester of the diarylketone carboxylic acid was not soluble in the methanol. Fortunately the contaminants which give an undesirable color to the diarylketone carboxylic acid are soluble in the excess methanol. This is believed to be the fact because when the dimethyl ester of the diarylketone carboxylic acid is filtered from the esterification mixture it does not possess the objectionable color which characterized the original diarylketone carboxylic acid.

Methanol is considered to be unique in the esterification reaction employed in the purification procedure of this invention. The solubility of higher esters, such as the ethyl ester of the diarylketone carboxylic acids, in alcohols such as methanol, ethanol, etc., is sufficiently great that an appreciable amount thereof is solubilized therein along with the contaminants. For such reason also the procedure of this invention is directed to the purification of symmetrical diarylketone carboxylic acids. Diarylketone carboxylic acids, as well as the esters thereof, wherein the carboxyl groups are not symmetrically arranged on the aromatic radicals have an appreciable solubility in methanol, ethanol, etc., and can therefore not effectively be separated from the impurities admixed therewith.

The dimethyl ester of the diarylketone carboxylic acid can, when desired, be converted back to the diarylketone carboxylic acid in any convenient manner. Thus the dimethyl ester can be reacted with an alkaline medium such as sodium hydroxide, potassium hydroxide, lithium hydroxide, etc., preferably in stoichiometric amounts, at a temperature which can be, for example, about 100° to about 200° C., at autogenous pressure, to obtain the corresponding alkali salt thereof. The alkali salt, in turn, is reacted with an aqueous acidic reagent such as hydrochloric acid, sulfuric acid, acetic acid, phosphoric acid, etc., having a concentration of about five to about 50 percent. The acidic medium is also preferably employed in approximately stoichiometric amounts. Temperatures on the order of about 25° to about 100° C. and atmospheric pressure can be employed. As a result of such reaction white, solid diarylketone carboxylic acid precipitates out of solution and can be recovered therefrom by filtration or other convenient means.

The process of this invention can better be described by reference to the following example. 336 grams of 1,1- di(para)tolylethane were oxidized with 3000 grams of nitric acid having a concentration of 25 percent at a temperature of 204° C. and a pressure of 350–400 pounds per square inch gauge for two hours. The benzophenone 4,4'-dicarboxylic acid recovered amounted to 411 grams and was tan in color. Into a two-gallon glass-lined autoclave equipped with a stirrer and steam jacket there was charged 700 grams of the impure benzophenone 4,4'-dicarboxylic acid so produced, five liters of methanol and 20 grams of sulfuric acid having a concentration of 95 percent. The autoclave was closed and the contents heated with stirring to 135° C. This was continued for one hour at an autogenous pressure of 130 pounds per square inch gauge. At the end of this time the autoclave was cooled to room temperature and the slurry withdrawn and filtered. The solid recovered was a white powdery dimethyl ester of benzophenone 4,4'-dicarboxylic acid. To a six-liter stainless steel beaker, fitted with a stirrer and provided with a hot plate heater, there was added 626 grams of the dimethyl ester and 2240 grams of a 15 percent aqueous solution of sodium hydroxide. The mixture was heated at a temperature of 100° to 105° C. for 1½ hours, at which time all the solids had dissolved. The solution of sodium salt which was formed was then treated with twice the stoichiometric amount of 37 percent hydrochloric acid and warmed for one-half hour at about 50° to 70° C. A white powdery benzophenone 4,4'-dicarboxylic acid precipitated out of solution. The acid was washed with water and dried at a temperature of 110° to 140° C. for 18 hours.

Obviously many modifications and variations of the invention as hereinabove set forth can be made without departing from the spirit and scope thereof, and therefore only such limitations should be imposed as are indicated in the appended claims.

We claim:
1. A process for purifying benzophenone 4,4'-dicarboxylic acid obtained as a result of the nitric acid oxidation of 1,1-di(para)tolylethane which comprises reacting said diarylketone carboxylic acid with methanol in excess of the amount stoichiometrically required to react with said diarylketone carboxylic acid to obtain the methyl ester thereof and thereafter recovering the methyl ester so obtained.
2. A process for purifying benzophenone 4,4'-dicarboxylic acid obtained as a result of the nitric acid oxidation of 1,1-di(para)tolylethane which comprises reacting said diarylketone carboxylic acid with methanol in excess of the amount stoichiometrically required to react with said diarylketone carboxylic acid to obtain the methyl ester thereof and thereafter recovering the methyl ester so obtained, reacting said methyl ester with an alkaline agent to obtain the corresponding alkali salt thereof end thereafter reacting said alkali salt with an acidic agent to obtain said diarylketone carboxylic acid.

References Cited by the Examiner

UNITED STATES PATENTS

| | | | |
|---|---|---|---|
| 2,569,440 | 10/51 | Agnew et al. | 260—525 |
| 2,823,228 | 2/58 | Raecke et al. | 260—575 XR |

OTHER REFERENCES

Hickinbottom: Reactions of Organic Compounds (London, 1948), pages 100–101 and 264–266.

LORRAINE A. WEINBERGER, *Primary Examiner.*

CHARLES B. PARKER, IRVING MARCUS, LEON ZITVER, *Examiners.*